United States Patent
Brandin et al.

(10) Patent No.: US 10,308,249 B2
(45) Date of Patent: Jun. 4, 2019

(54) ADAPTIVE CRUISE CONTROL SYSTEM AND VEHICLE COMPRISING AN ADAPTIVE CRUISE CONTROL SYSTEM

(71) Applicant: Volvo Car Corporation, Gothenburg (SE)

(72) Inventors: Magnus Brandin, Molnlycke (SE); Mohammad Ali, Angered (SE)

(73) Assignee: Volvo Car Corporation, Gothenburg (SE)

( * ) Notice: Subject to any disclaimer, the term of this patent is extended or adjusted under 35 U.S.C. 154(b) by 30 days.

(21) Appl. No.: 15/605,053

(22) Filed: May 25, 2017

(65) Prior Publication Data

US 2017/0349175 A1 Dec. 7, 2017

(30) Foreign Application Priority Data

Jun. 7, 2016 (EP) ..................................... 16173338

(51) Int. Cl.
*B60Q 1/34* (2006.01)
*B60W 10/04* (2006.01)
(Continued)

(52) U.S. Cl.
CPC ............ *B60W 30/146* (2013.01); *B60Q 1/34* (2013.01); *B60W 10/04* (2013.01); *B60W 10/18* (2013.01);
(Continued)

(58) Field of Classification Search
CPC ................ B60Q 1/34; B60W 2540/04; B60W 2540/18; B60W 2720/10; B60W 2720/18; B60W 2720/20; B60W 2550/308; B60W 2520/10; B60W 2510/18; B60W 2510/20; B60W 2050/146; B60W 50/16;
(Continued)

(56) References Cited

U.S. PATENT DOCUMENTS

| 2008/0300766 | A1* | 12/2008 | Kumabe | ............ B60K 31/0075 701/98 |
| 2010/0023223 | A1* | 1/2010 | Huang | .................. B60W 40/09 701/44 |

(Continued)

FOREIGN PATENT DOCUMENTS

| DE | 10 2011 011120 A1 | 8/2012 |
| DE | 10 2012 002318 A1 | 8/2013 |

(Continued)

*Primary Examiner* — Atul Trivedi
(74) *Attorney, Agent, or Firm* — Snyder, Clark, Lesch & Chung, LLP

(57) ABSTRACT

A vehicle and an adaptive cruise control system, ACC, is provided. The ACC system includes a control unit configured to control a steering angle of said vehicle in relation to detected road lanes and/or road markings. The ACC system further includes a steering wheel arranged to allow the provision of manual steering input to the steering system of the vehicle and a steering angle sensor. The steering system is configured to identify a steering wheel jerk, performed as a clockwise- and counter-clockwise actuation of the steering wheel within a predetermined time range and to steer the host vehicle from a first, current, road lane to a second road lane based on the identified jerk as indicated by the steering angle sensor.

11 Claims, 2 Drawing Sheets

(51) Int. Cl.
  *B60W 10/18* (2012.01)
  *B60W 10/20* (2006.01)
  *B60W 30/12* (2006.01)
  *B60W 30/14* (2006.01)
  *B60W 30/16* (2012.01)
  *B60W 30/18* (2012.01)
  *B60W 50/14* (2012.01)
  *B60W 50/16* (2012.01)
  *B62D 15/02* (2006.01)

(52) U.S. Cl.
  CPC ............ *B60W 10/20* (2013.01); *B60W 30/12* (2013.01); *B60W 30/16* (2013.01); *B60W 30/162* (2013.01); *B60W 30/18163* (2013.01); *B60W 50/16* (2013.01); *B62D 15/021* (2013.01); *B62D 15/0255* (2013.01); *B60W 2050/146* (2013.01); *B60W 2510/18* (2013.01); *B60W 2510/20* (2013.01); *B60W 2520/10* (2013.01); *B60W 2540/04* (2013.01); *B60W 2540/18* (2013.01); *B60W 2550/308* (2013.01); *B60W 2710/18* (2013.01); *B60W 2710/20* (2013.01); *B60W 2720/10* (2013.01); *B60W 2750/308* (2013.01)

(58) Field of Classification Search
  CPC .... B60W 30/12; B60W 30/146; B60W 30/16; B60W 30/162; B60W 30/18163; B60W 10/04; B60W 10/18; B60W 10/20; B60W 2750/308; B62D 15/021
  USPC .......................................................... 701/41
  See application file for complete search history.

(56) References Cited

U.S. PATENT DOCUMENTS

| | | | |
|---|---|---|---|
| 2010/0023245 A1* | 1/2010 | Huang | B60W 30/12 701/117 |
| 2010/0228420 A1* | 9/2010 | Lee | B62D 1/28 701/26 |
| 2013/0002416 A1 | 1/2013 | Gazit | |
| 2013/0231830 A1* | 9/2013 | Van Dan Elzen | B60W 50/14 701/42 |
| 2014/0257686 A1* | 9/2014 | Feldman | G06F 17/00 701/300 |
| 2015/0166062 A1* | 6/2015 | Johnson | B60W 30/12 701/41 |
| 2015/0217768 A1* | 8/2015 | Fairgrieve | B60W 30/143 701/93 |
| 2017/0247032 A1* | 8/2017 | Lee | B60W 30/12 |
| 2017/0349174 A1* | 12/2017 | Brandin | B60K 31/0008 |
| 2018/0345959 A1* | 12/2018 | Fujii | B60W 30/0953 |
| 2018/0346027 A1* | 12/2018 | Fujii | B62D 15/025 |
| 2018/0350242 A1* | 12/2018 | Fujii | G08G 1/167 |

FOREIGN PATENT DOCUMENTS

| | | |
|---|---|---|
| DE | 10 2012 207644 A1 | 11/2013 |
| DE | 10 2014 201282 A1 | 7/2015 |
| DE | 10 2014 220758 A1 | 4/2016 |

\* cited by examiner

ADAPTIVE CRUISE CONTROL SYSTEM AND VEHICLE COMPRISING AN ADAPTIVE CRUISE CONTROL SYSTEM

RELATED APPLICATION

This application claims priority under 35 U.S.C. § 119 based on European Patent Application No. 16173338.1, filed Jun. 7, 2016, the disclosure of which is hereby incorporated by reference herein.

TECHNICAL FIELD

Embodiments described herein relate to an adaptive cruise control system. Embodiments described herein further relate to a vehicle comprising an adaptive cruise control system.

BACKGROUND

Some vehicles today are equipped with autonomous and/or at least partly automatic drive systems. Such systems generally aim at increasing comfort and/or safety for vehicle occupants. Some systems are also arranged to increase safety for persons in the host vehicle and/or its surrounding.

An example of such a system is an adaptive cruise control system, ACC. The ACC may comprise one or more sensors, such as a camera and/or a radar, which continuously monitors the host vehicle surrounding. The ACC may also comprise or be connected to a drive control system which adjusts a velocity of the host vehicle in dependence to a vehicle in front of the host vehicle as detected by the sensors. If the host vehicle approaches a preceding vehicle driving in the same lane the ACC may adjust the selected velocity such that the host vehicle keeps a safe distance to the preceding vehicle and follows the preceding vehicle at the safe distance. An ACC can also keep a selected host vehicle velocity where no vehicles are present in front of the host vehicle.

Some ACCs are also capable to steer the host vehicle in some situations, such as below a threshold velocity. The sensors of the host vehicle may be configured to detect road markings and may control the steering system to follow the markings. Such an ACC may also be referred to as a Pilot Assist System or similar.

An ACC may thus perform some drive related functions and can therefore relieve the vehicle operator from some specific tasks, such as controlling a host vehicle velocity in some situations. It would however be desirable with an ACC which, at least partly, can control the host vehicle in a larger number of traffic scenarios and situations than possible today. Accordingly, improvements in the field of adaptive cruise controls and functions thereof are still desirable.

SUMMARY

Embodiments described herein aim to provide an adaptive cruise control system capable of assisting a vehicle operator in various traffic scenarios.

According to an embodiment, this is provided by an adaptive cruise control system for controlling at least one of speed and steering angle of a vehicle in relation to moving or stationary objects by accelerating, retarding or steering the vehicle, said system comprising; a vehicle throttle controller, a vehicle braking system controller, a steering system, at least one object detection sensor arranged to detect moving or stationary objects and road lanes and/or road markings in a surroundings of said vehicle, and a control unit configured to control a steering angle of said vehicle in relation to detected road lanes and/or road markings by controlling the steering system, wherein in that said adaptive cruise control system further comprises; a steering wheel arranged to allow the provision of manual steering input to the steering system of the vehicle and a steering angle sensor, wherein the steering system is configured to identify a steering wheel jerk, performed as a clockwise- and counter-clockwise actuation of the steering wheel within a predetermined time range, by comparing data from the steering angle sensor with at least one predetermined threshold and to steer the host vehicle from a first, current, road lane to a second road lane based on the identified jerk as indicated by the steering angle sensor.

Since the steering system is configured to identify a steering wheel jerk, performed as a clockwise- and counter-clockwise actuation of the steering wheel within a predetermined time range and to steer the host vehicle from a first, current, road lane to a second road lane based on the identified jerk as indicated by the steering angle sensor, the adaptive cruise control enables automatic lane change. Instead of overriding or disabling an activated ACC system by manual steering, a vehicle operator may just indicate, by a quick steering wheel jerk, that the ACC system shall control the vehicle to switch lane. The ACC may then optionally control the host vehicle to stay in the second road lane. Accordingly, the ACC system is capable of assisting a vehicle operator in various traffic scenarios where a prior art ACC would be disabled or would not assist the vehicle operator with automatic or semi-automatic drive functions.

According to some embodiments, a duration of the predetermined time range is less than 2 seconds, preferably less than 1 second. In some embodiments the time range is shorter, such as about 0.2-1 second. An ordinary steering maneuver, e.g. for a manual lane switch or a left- or right turn, generally has a longer duration. Hereby input to automatic lane change is clearly distinguishable from other steering operations.

According to some embodiments, a first predetermined threshold is identifiable by a first clockwise or counter-clockwise steering angle of at least $\alpha$ degrees, $\alpha$ being at least 1 degree. In some embodiments a is larger, such as 3 degrees. A clockwise steering angle of at least $\alpha$ degrees may indicate a lane switch to the right, a counter-clockwise steering angle of at least $\alpha$ degrees may indicate a lane switch to the left.

According to some embodiments, a second predetermined threshold is identifiable by a second steering angle of at least $\beta$ degrees, $\beta$ being at least 1 degree, the direction of the second steering angle being opposite the first steering angle. In some embodiments is larger, such as 3 degrees. A first clockwise steering angle of at least $\alpha$ degrees followed by a second counter-clockwise steering angle of at least $\beta$ degrees may indicate a lane switch to the right. A first counter-clockwise steering angle of at least $\alpha$ degrees followed by a second clockwise steering angle of at least $\beta$ degrees may indicate a lane switch to the left. $\alpha$ and $\beta$ may be substantially of the same magnitude, such that the steering wheel ends up in the initial position again once the jerk is performed.

According to some embodiments, the at least one of the first and second predetermined threshold is represented by a change in steering angle of at least 10 degrees/second. Hereby automatic lane change-initiation is distinguishable from ordinary steering operations where the change in steering angle often is smaller.

According to some embodiments, the at least one of the first and second predetermined threshold is represented by a rate of change in steering angle of at least 50 degrees/s². Hereby automatic lane change-initiation is distinguishable from ordinary steering operations where the rate of change in steering angle often is smaller.

According to some embodiments, the adaptive cruise control system further comprises a display arrangement, arranged to display a representation of road lanes or road markings in front of the host vehicle, and an input arrangement, enabling by selective input thereto, selection of a displayed representation of road lanes or road markings to be steered into. The display arrangement can facilitate automatic lane change initiation for the vehicle operator since available/selectable lanes can be represented on a display, such as a dashboard display or a head-up-display.

According to some embodiments, the adaptive cruise control system further comprises turn signal indicators, and in that initiation of a lane change is confirmed via activation of a turn signal indicator. The vehicle operator may, via the turn signal indicator activation, receive instant response on the lane change. Further, also persons in the host vehicle surrounding will be aware that the host vehicle is about to switch lanes. Hereby safety is increased.

According to some embodiments, the adaptive cruise control system further comprises a steering wheel vibration arrangement for vibrating the steering wheel and in that it is further arranged to confirm initiation of a lane change through activating the steering wheel vibration arrangement to provide haptic confirmation. The vehicle operator may, via the haptic confirmation, receive instant response on the lane change.

Embodiments described herein also aim to provide a vehicle comprising an adaptive cruise control system capable of assisting a vehicle operator in various traffic scenarios. According to some embodiments, this is provided by a vehicle comprising an adaptive cruise control system according to embodiments disclosed herein.

BRIEF DESCRIPTION OF THE DRAWINGS

The various aspects of embodiments herein, including its particular features and advantages, will be readily understood from the following detailed description and the accompanying drawings, in which.

DETAILED DESCRIPTION

Embodiments herein will now be described more fully with reference to the accompanying drawings, in which some embodiments are shown. Like numbers refer to like elements throughout and well-known functions or constructions will not necessarily be described in detail for brevity and/or clarity.

Figure 1:
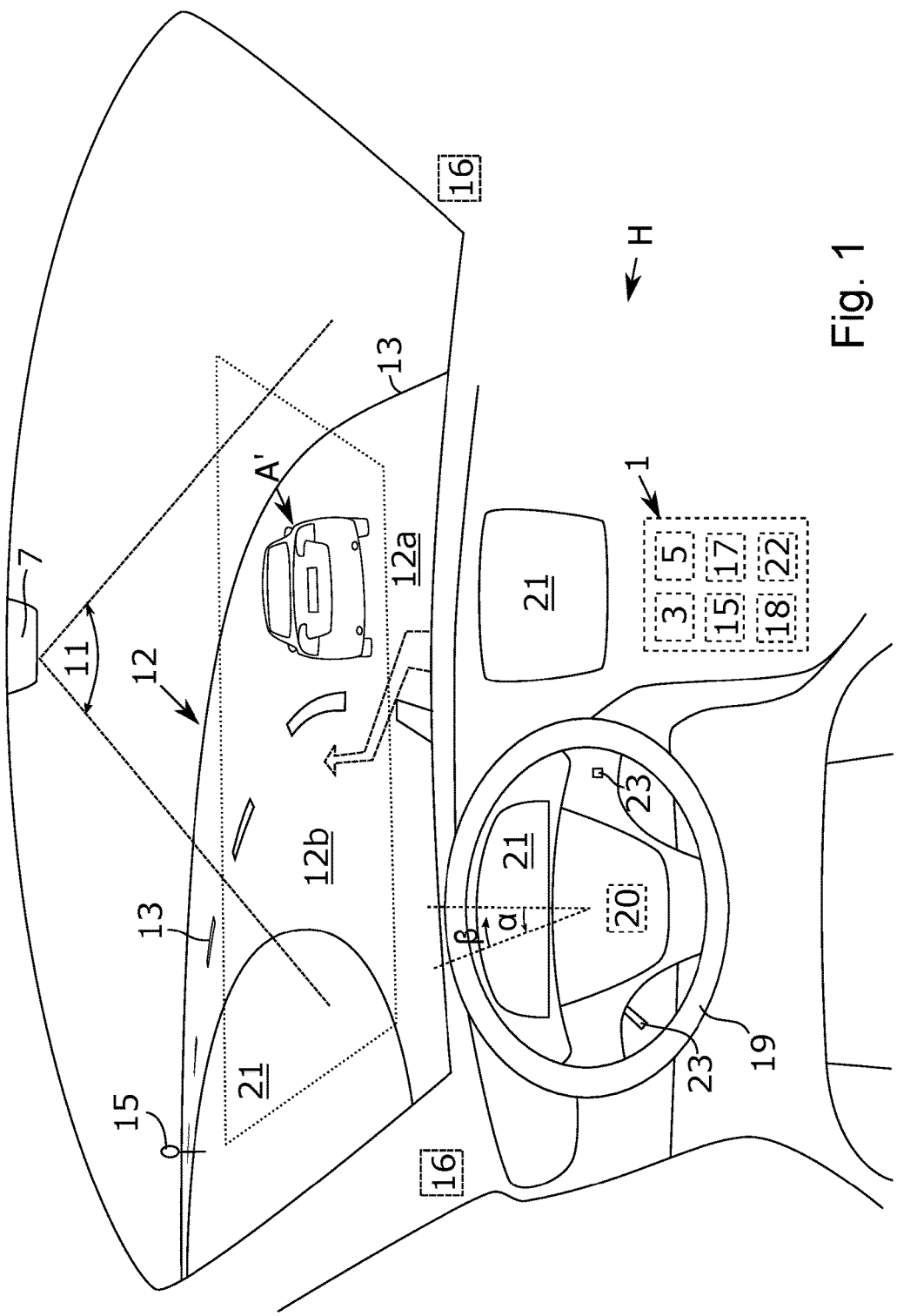
FIG. 1 illustrates a vehicle and an adaptive cruise control system according to some embodiments in a traffic scenario.

FIG. 1 illustrates an adaptive cruise control system, ACC 1. The ACC is arranged to provide semi-automatic drive functionality to a host vehicle H in which the ACC 1 is arranged.

The ACC system 1 is arranged to control at least one of speed and steering angle of the host vehicle H in relation to moving or stationary objects by accelerating, retarding or steering the vehicle H. The ACC 1 comprises or is connected to a vehicle throttle controller 3 and a vehicle braking system controller 5. The ACC 1 can be connected to a host vehicle engine and a host vehicle braking system, such that the ACC 1, directly or indirectly, can control acceleration and/or deceleration of the host vehicle H. The ACC 1 can e.g. increase a host vehicle velocity by increasing the engine speed, and decrease the host vehicle velocity by motor-braking or by activation of one or more wheel brakes. The ACC 1 may e.g. be connected to an ABS (anti-lock braking system), such that one or more wheel brakes can be activated selectively.

The ACC may also provide some steering functionality to the host vehicle H. The host vehicle H or the ACC 1 can comprise an electrical/mechanical control arrangement, arranged to control steering and velocity of the host vehicle H at least partly based on information received from detection sensors, described below. The ACC 1 can comprise or be connected to a vehicle steering system 17, such that the ACC 1, directly or indirectly, can control a direction of at least some of the wheels of the host vehicle H. Hereby e.g. a yaw rate of the host vehicle H can be adjusted, such that the driving direction of the host vehicle H is adjusted in accordance with the input from the ACC 1. When the ACC 1 may control steering functions it may also be referred to as a pilot assist system or similar. It may then, at least in some velocity-ranges, detect road markings and steer the host vehicle H to follow said markings.

In some embodiments, the ACC 1 comprises, or is connected to, a number of vehicle subsystems. Each such subsystem may provide some automatic- or semi-automatic drive functions. Examples of such subsystem are: lane departure warning and/or control systems, collision avoidance systems, auto-braking systems, traffic sign recognition systems, some communication systems, some navigation systems, ultrasonic sensor systems, infrared camera systems, inertial measuring systems, intelligent transportation systems, safe road train systems, automatic parking systems, etc.

The ACC 1 further comprises or is connected to at least one object detection sensor 7 which is arranged to detect moving or stationary objects in the surroundings in front of the host vehicle H. Examples of such objects or targets are the preceding vehicle A' illustrated in FIG. 1. The object detection sensor 7 is also arranged to detect road lanes 12, 12a, 12b and/or road markings 13 in the host vehicle surrounding.

The object detections sensor or sensors 7 can be one or more camera sensors, one or more radar sensors and/or one or more lidar-sensors. The at least one sensor 7 can be arranged at any position in/on the host vehicle H from where detection of a vehicle surrounding is possible. Sensors 7 may for example be arranged at a vehicle front-, side and/or rear portion, at a vehicle grille, bumpers, rear-view-mirrors and/or a windshield. Some sensors 7 may be arranged in or near a vehicle compartment, chassis, motor, drivetrain and/or wheels. The sensor position may depend on the type of sensor used. For example, a camera sensor may be arranged at an inside of a windshield, while one or more radar sensors and/or a lidar sensor may be arranged in the grille and/or bumpers. In FIG. 1, a sensor monitoring field 11 is illustrated. The sensor monitoring field 11 may be directed in any direction and may cover parts of the host vehicle surrounding or the host vehicle surrounding in substantially all directions.

A camera sensor may be e.g. a front-, side- or rear-facing digital camera equipped with or connected to one or more processors with object recognition logics. Hereby surrounding objects, such as road lanes 12, road markings 13, other vehicles A', traffic signs 15, pedestrians, animals, different obstacles etc. may be detected and in some cases, identified/classified. Radar sensors include transmitters that emit signals that bounce back from objects around the host vehicle H, and receivers that receive the returned signals. The radar sensors may include e.g. ultra wide band radars, narrow band radars and/or multi node radars. Lidar-sensors may measure distances to objects through illuminating the objects with a laser and analyzing the reflected light. Other types of sensors 7 used to monitor the vehicle surrounding may be e.g. ultrasonic sensors and/or infrared sensors.

The ACC system 1 also comprises a control unit 15 configured to control a steering angle of the host vehicle H in relation to detected road lanes 12 and/or road markings 13 by controlling the steering system 17. The control unit 15 may also be configured to control the speed of the host vehicle H in relation to a selected one of the detected moving or stationary objects A' by controlling the throttle controller 3 and/or the vehicle braking system controller 5. The control unit 15 and/or the steering system 17 and/or the ACC 1 may comprise any necessary processors with logic for the identification of the jerk and for comparing data from a steering angle sensor 18 with predetermined thresholds.

The ACC system 1 further comprises a steering wheel 19 arranged to allow the provision of manual steering input to the steering system 17 of the vehicle H and the steering angle sensor 18. The steering angle sensor 18 can be any type of sensor configured to measure steering wheel position angle and rate/acceleration of steering wheel turn. The steering angle sensor 18 can for example be a digital steering position sensor which may be contactless. It may be a controller area network (CAN) Bus module steering angle sensor, an analog steering angle sensor or a resetting steering angle sensor. The steering angle sensor 18 can, for example, be arranged in a sensor cluster in the steering column. Two or more sensors 18 can be used for redundancy and confirmation. The steering angle sensor 18 may also be arranged at any other steer- or gearing related parts. In some embodiments the steering angle sensor 18 is co-operating with or replaced by another type of sensor which is capable of detecting an adjustment of host vehicle yaw rate, host vehicle heading or similar and to provide information thereof to the steering system or ACC for the lane switch.

The steering system 17 is configured to identify a steering wheel jerk, performed as a clockwise- and counter-clockwise actuation of the steering wheel 19 within a predetermined time range, by comparing data from the steering angle sensor 18 with at least one predetermined threshold and to steer the host vehicle H from a first, current, road lane 12a to a second road lane 12b based on the identified jerk as indicated by the steering angle sensor 18.

In the scenario illustrated in FIG. 1, the ACC 1 of the host vehicle H is set to follow the preceding vehicle A'. Alternatively the host vehicle H is catching up the preceding vehicle A'. If the driver of the host vehicle H decides that he/she would like the host vehicle to switch lane from the current lane 12a, i.e. the lane in which the host vehicle H is initially positioned within, to a next lane 12b, i.e. a lane that the driver would like the host vehicle to be positioned within when the lane change maneuver is completed, he/she turns the steering wheel 19 at least α degrees in a counter-clockwise direction from a neutral steering wheel position, then he/she turns the steering wheel 19 at least β degrees in a clockwise direction. The counter-clockwise turn followed by a clockwise turn may be performed within a predetermined time range of about 0.2-1 second. The angles α and β may be of substantially the same magnitude, wherefore the steering wheel 19 will be positioned in the neutral position after the two actuations. Since the counter-clockwise and clockwise actuations are relatively small, such as in the range of 1-5 degrees, and performed within a short time range of about 0.2-1 second, it may be referred to as a jerk.

A counter-clockwise turn followed by a clockwise turn will initiate a lane-switch to an adjacent lane to the left on a lane in which the host vehicle is positioned. A clockwise turn followed by a counter-clockwise turn will initiate a lane-switch to an adjacent lane to the right on a lane in which the host vehicle is positioned. Hereby it may be perceived by the driver as he/she "points" in the lane-switch-direction with an upper part of the steering wheel.

In some embodiments the first and/or the second predetermined threshold is represented by a change in steering angle of at least 10 degrees/second. In other embodiments, the first and/or the second predetermined threshold is represented by a change in steering angle of less than 10 degrees/second. In some embodiments the first and/or the second predetermined threshold is represented by a rate of change in steering angle of at least 50 degrees/s$^2$. Hereby the ACC can differentiate between a steering wheel turn for lane switch from a "normal" steering wheel turn for change of vehicle driving directions.

The host vehicle H or the ACC may optionally comprise one or more display arrangements 21. Such display arrangement can for example be a head-up-display, HUD, or a display at a dashboard or centerstack of the host vehicle. The display arrangement 21 is arranged to display a representation of road lanes 12a, 12b or road markings 13 in front of the host vehicle H. The host vehicle H or the ACC may also optionally comprise an input arrangement 22, through which the driver may input a selection of a displayed representation of road lanes 12a, 12b or road markings 13 which the host vehicle H is to be steered into. The input arrangement 22 may comprise confirmation means, e.g. in form of a button or lever 23.

Thus, when a vehicle operator turns the steering wheel 19 he/she can see a representation of the road lanes 12 e.g. in the form of an arrow, highlight or similar, and how an upcoming lane switch may be performed in dependence of the steering wheel actuation. He/she may then select or confirm a road lane 12a, 12b via the input arrangement 22 with the lever 23 or by pointing with a finger on a representation of the lane directly on a display.

The input arrangement 22 can be connected to cameras and may comprise one or more processors with logic for recognition and/or classification of objects in the host vehicle surrounding. The ACC or the input arrangement 22 may optionally suggest selectable road lanes 12a, 12b based on detection of gaps in the traffic, driver behavior/history of lane switches etc. and a driver may confirm if such suggested lane switch is to be performed or not.

In some embodiments, the ACC 1 comprises or is connected to turn signal indicators 16 of the host vehicle H. Initiation of a lane change may then be confirmed via activation of a turn signal indicator 16.

In some embodiments a steering wheel jerk may temporarily disable an activated lane keeping assistance system. Hereby such lane keeping assistance system may be used in combination with the lane switch function of the ACC 1 according to embodiments described herein.

In some embodiments, the ACC 1 comprises a steering wheel vibration arrangement 20 for vibrating the steering wheel 19. The ACC 1 may be arranged to confirm initiation of a lane change through activating the steering wheel vibration arrangement 20 to provide haptic confirmation to a vehicle operator which holds the steering wheel.

In some embodiments, the ACC 1 or any processor comprised therein is configured to learn and identify some driver behaviors, such as characteristics of jerks performed by different drivers. Logic/software may then, based on the jerk characteristics, "learn" which jerk characteristics performed by an identified driver, which shall initiate a lane change. This may for example be done by analyzation of statistics on earlier fully performed lane switches and earlier aborted or partly performed lane switches. Such self-learning-behavior may be part of a neural network and may also be referred to as neural network induced behavior or machine learning. Such network may comprise a number of interconnected group of nodes, which perform functions resembling of the functions of human brain neurons. Such network may estimate or approximate functions which can depend on various kind of input and are today used e.g. for speech and handwriting recognition. Hereby also jerks performed as a relatively small or limited steering wheel actuation may be identified and used for lane-switch-initiation. Driver identification may be performed by any suitable means, such as by personal car keys, camera with face/body recognition within the passenger compartment, seat settings or similar.

Figure 2:
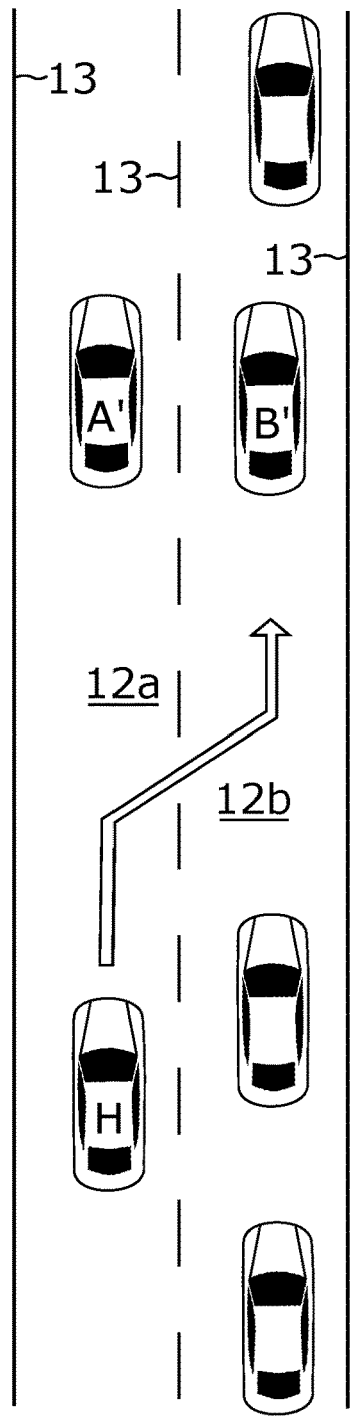
FIG. 2 illustrates a vehicle and an adaptive cruise control system according to some further embodiments in a traffic scenario.

FIG. 2 illustrates a scenario where the host vehicle H is driven on a road with road lanes 12a, 12b and road markings 13. The host vehicle H comprises an ACC according to embodiments herein. The host vehicle H is driven in a left lane 12a, rear of a surrounding vehicle A'.

If the host vehicle driver decides to switch lane to the right lane 12b, e.g. to position the host vehicle H in the gap behind vehicle B' he/she can jerk the steering wheel some degrees clockwise. Such a "lane switch jerk" may be at least a pre-determined number of degrees and may have a pre-determined maximum time duration.

In the embodiment illustrated in FIG. 2 the velocity of the host vehicle H may optionally be decreased and adapted after the velocity of vehicle B'. Accordingly, the driver of the host vehicle H does not have to manually change the host vehicle velocity or disable or override the ACC. Since the ACC can stay activated or enabled during the entire process, driver comfort is increased.

A lane switch jerk can be aborted or dropped by a further jerk of the steering wheel in a direction contrary to the first jerk. In FIG. 2 such a "lane switch drop jerk" would be initiated by a steering wheel actuation in a counter-clockwise direction.

Figure 3:
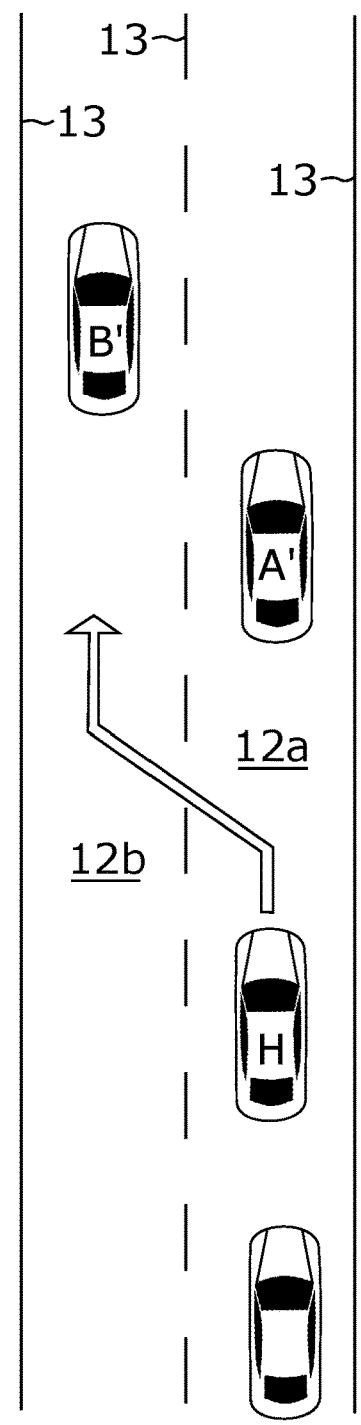
FIG. 3 illustrates a vehicle and an adaptive cruise control system according to yet some embodiments in a traffic scenario.

FIG. 3 illustrates a further scenario where the host vehicle H is driven on a road with road lanes 12a, 12b and road markings 13. The host vehicle H comprises an ACC according to embodiments herein. The ACC may keep a velocity which is selected by the host vehicle driver or is set to adjust the host vehicle velocity after the preceding vehicle A'. The host vehicle H is driven in the right lane 12a.

If the driver of the host vehicle H would like to switch lane to the left lane 12b, rear of vehicle B', he/she may jerk the steering wheel counter-clockwise. Such a "lane switch jerk" may be at least a pre-determined number of degrees and may have a pre-determined maximum duration. The driver of the host vehicle does not have to manually change the host vehicle velocity or disable or override the ACC. Since the ACC can stay activated or enabled during the entire process, driver comfort is increased.

The invention claimed is:

1. An adaptive cruise control system for controlling at least one of speed or steering angle of a vehicle in relation to moving or stationary objects by accelerating, retarding or steering the vehicle, said system comprising:
   a vehicle throttle controller,
   a vehicle braking system controller,
   a steering system,
   at least one object detection sensor arranged to detect moving or stationary objects and road lanes and/or road markings in a surroundings of said vehicle, and
   a control unit configured to control a steering angle of said vehicle in relation to detected road lanes and/or road markings by controlling the steering system,
   wherein said adaptive cruise control system further comprises:
   a steering wheel arranged to allow the provision of manual steering input to the steering system of the vehicle, and
   a steering angle sensor, wherein the steering system is configured to identify a steering wheel jerk, performed as a clockwise and counter-clockwise actuation of the steering wheel within a predetermined time range, by comparing data from the steering angle sensor with at least one predetermined threshold and to steer the host vehicle from a first, current, road lane to a second road lane based on the identified jerk as indicated by the steering angle sensor.

2. The adaptive cruise control system according to claim 1, wherein a duration of the predetermined time range is less than 2 seconds.

3. The adaptive cruise control system according to claim 1, wherein a duration of the predetermined time range is less than 1 second.

4. The adaptive cruise control system according to claim 1, wherein a first predetermined threshold is identifiable by a first clockwise or counter-clockwise steering angle of at least ($\alpha$) degrees, ($\alpha$) being at least 1 degree.

5. The adaptive cruise control system according to claim 4, wherein a second predetermined threshold is identifiable by a second steering angle of at least ($\beta$) degrees, ($\beta$) being at least 1 degree, the direction of the second steering angle being opposite the first steering angle.

6. The adaptive cruise control system according to claim 5, wherein at least one of the first or second predetermined threshold is represented by a change in steering angle of at least 10 degrees/second.

7. The adaptive cruise control system according to claim 5, wherein at least one of the first or second predetermined threshold is represented by a rate of change in steering angle of at least 50 degrees/$s^2$.

8. The adaptive cruise control system according claim 1, further comprising:
   a display arrangement arranged to display a representation of road lanes or road markings in front of the host vehicle, and
   an input arrangement enabling by selective input thereto, selection of a displayed representation of road lanes or road markings to be steered into.

9. The adaptive cruise control system according to claim 1, further comprising:
   turn signal indicators, wherein initiation of a lane change is confirmed via activation of a turn signal indicator.

10. The adaptive cruise control system according to claim 1, further comprising:

a steering wheel vibration arrangement for vibrating the steering wheel, wherein initiation of a lane change is confirmed through activating the steering wheel vibration arrangement to provide haptic confirmation.

11. A vehicle comprising an adaptive cruise control system according to claim 1.

* * * * *